United States Patent [19]

Dressler

[11] 4,078,703

[45] Mar. 14, 1978

[54] SILO HAVING AIR AGITATING LOOSENING DEVICES

[75] Inventor: Wilfried Dressler, Heidelberg, Germany

[73] Assignee: Portland Zementwerke Heidelberg AG, Heidelberg, Germany

[21] Appl. No.: 734,454

[22] Filed: Oct. 21, 1976

[30] Foreign Application Priority Data

Oct. 24, 1975 Germany .............................. 2547667

[51] Int. Cl.² .......................... B65G 3/12; B65G 69/06
[52] U.S. Cl. ..................................... 222/195; 222/328; 302/53
[58] Field of Search ............... 222/195, 193, 194, 328; 302/28, 52, 53

[56] References Cited

U.S. PATENT DOCUMENTS

| | | | |
|---|---|---|---|
| 2,686,617 | 8/1954 | Tollman, Jr. et al. | 222/195 |
| 3,121,593 | 2/1964 | McIlvaine | 222/195 X |
| 3,179,379 | 4/1965 | Grun et al. | 222/195 X |
| 3,391,832 | 7/1968 | Weislehner | 222/195 |

*Primary Examiner*—Allen N. Knowles
*Assistant Examiner*—David A. Scherbel
*Attorney, Agent, or Firm*—Staas & Halsey

[57] ABSTRACT

A large capacity silo for flour-like bulk materials provided with a discharger having a body provided with an inside slanting wall and an annular bottom, a conical hood located above the bottom, broadening downwardly and provided with discharge openings each of which is provided with a shut-off device, a loosening device associated with each of the discharge openings, and a line supplying to the loosening up devices a quantity of pressure air corresponding to the maximum quantity of bulk material for the loosening up process which can be drawn off via the discharge openings, the opening of each shut-off device being designed for maximum discharge.

5 Claims, 1 Drawing Figure

SILO HAVING AIR AGITATING LOOSENING DEVICES

BACKGROUND AND SUMMARY OF INVENTION

The present invention relates generally to silos, particularly those of large capacity for flour-like bulk material which are provided with a discharger.

It is well known in the art that so-called flat funnel silos require high pressure air for emptying, and complete emptying of the silo is not possible as a practical matter. Moreover, controllable intermixing of the stored bulk material cannot be achieved in silos presently known in the art.

The present invention is a silo of the initially mentioned type wherein complete or almost complete discharge of the silo is possible. Furthermore, because of the considerably lower requirement for air pressure, the operating cost is lowered considerably. Effective dust removal with short dust-removal lines and a simple dust return system is achieved with the present invention, and the air pressure supply is accomplished in dependence on the bulk material discharge in the area of the pertinent loosening-up device. As a result, the discharge and the intermixing of the bulk material is improved.

According to the present invention, the foregoing is achieved in a silo, particularly a large capacity silo for flour-like bulk material with a discharger, having a body with an inside slanting wall and an annular bottom, above which a conical hood, which increases in width downwardly, is disposed, and which is provided with discharge openings, each being provided with a shutoff device. A loosening up device is assigned to each of the discharge openings. The volume of pressure air fed via a line to the loosening-up devices corresponds to the maximum volume (quantity) of bulk material which can be drawn off via the dischage openings for the purpose of loosening up. The cross section of the opening of each shutoff device is designed for the maximum volume of discharge.

According to a preferred embodiment of the present invention the line for the supply of pressure air for the loosening up device is developed as a ring conduit. Preferably, at least two discharge openings equipped with shutoff devices are provided in the lower area of the inside cone and the bulk material is carried from the discharge openings to a storage tank.

According to a further embodiment of the invention, a dust collecting arrangement is provided inside the conical hood, which may be disposed on a platform, particularly a steel platform.

Finally another embodiment of the invention is characterized by a slanting wall of the silo passing over into a perpendicular wall below the level of the highest point of the conical hood.

DESCRIPTION OF THE PREFERRED EMBODIMENT

Figure 1:
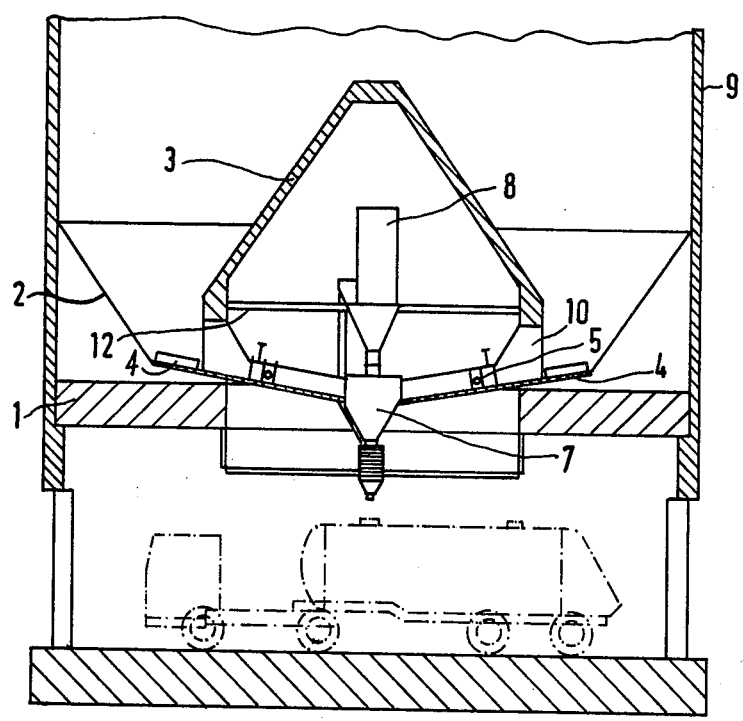
FIG. 1 is a vertical sectional view taken through the silo of the present invention.

The body 9 of the silo has a bottom in the form of an annular shaped plate 1. A slope 2 is provided along the wall of the slio. The conical hood 3 is provided with several discharge openings 10 which are evenly distributed along the periphery thereof. There is assigned to each of the openings 10 a shutoff device 5 which is located above the opening of the annular plate 1.

A loosening up device 4, provided in the area of each discharge opening 10, is acted upon by pressure air. The loosening up device 4 may be constructed in a known manner like a box and has discharge openings for the pressure air on its side facing the bulk material. The cross sections of the openings of the individual shutoff devices 5 are disigned for a maximum discharge of bulk material.

The dust removal arrangement 8 is disposed on a platform 12.

Insofar as the stored quantity of bulk material is drawn off with a maximally opened shutoff device 5, the entire volume of pressure air is fed to the loosening up arrangement 4, which is assigned to its discharge opening 10. Whenever the discharge is accomplished via several opened shutoff devices 5, the available volume of pressure air is divided up corresponding to the volume (quantity) of removed bulk material, between the pertinent loosening up devices 4. This division is made automatically, so that even a change in the cross section of the openings of one or more of the shutoff devices 5 leads to a change of the assigned quantity of pressure air. By this coupling of the division of the quantity of pressure air with the removal of the bulk material via the individual shutoff devices 5, an optimum operation will be achieved which can be controlled with a view to the intermixing of the bulk material during removal.

I claim:

1. A silo for flour-like bulk materials with a discharger, comprising: means for controllably intermixing and completely discharging the bulk-like material including; a body having an inside slanting wall and an annular bottom, a conical hood above said bottom and broadening downwardly and being provided with at least two discharge openings in the lower area thereof, each of said discharge openings being provided with a shutoff device, a collection tank within said conical hood, means for carrying the bulk material from said discharge openings to said collection tank, a loosening device located in said body and in front of each of said discharge openings, and supply line means for feeding a quantity of pressure air to said loosening up devices corresponding to the maximum quantity of bulk material for the loosening up process which can be drawn off via said discharge openings.

2. A silo as in claim 1, wherein said supply line means for feeding the pressure air to said loosening up devices is formed as a ring conduit.

3. A silo as in claim 1, including a dust removing device disposed in said conical hood at a position above said collection tank.

4. A silo as in claim 3, wherein said dust removing device is disposed on a platform below the roof of said conical hood and said platform is also above said collection tank.

5. A silo as in claim 4, wherein said slanting wall of the body of said silo passes over into a perpendicular wall below the level of the highest point of said conical bond.

* * * * *

UNITED STATES PATENT AND TRADEMARK OFFICE
CERTIFICATE OF CORRECTION

PATENT NO. : 4,078,703
DATED : March 14, 1978
INVENTOR(S) : Wilfried Dressler

It is certified that error appears in the above-identified patent and that said Letters Patent are hereby corrected as shown below:

* Column 1, line 38, "dischage" should be -- discharge --;
* Column 1, line 66, "slio" should be -- silo --;
  Column 2, line 65, "bond" should be -- hood --.

Signed and Sealed this

Twenty-second Day of January 1980

[SEAL]

Attest:

SIDNEY A. DIAMOND

Attesting Officer

Commissioner of Patents and Trademarks